Patented May 30, 1939

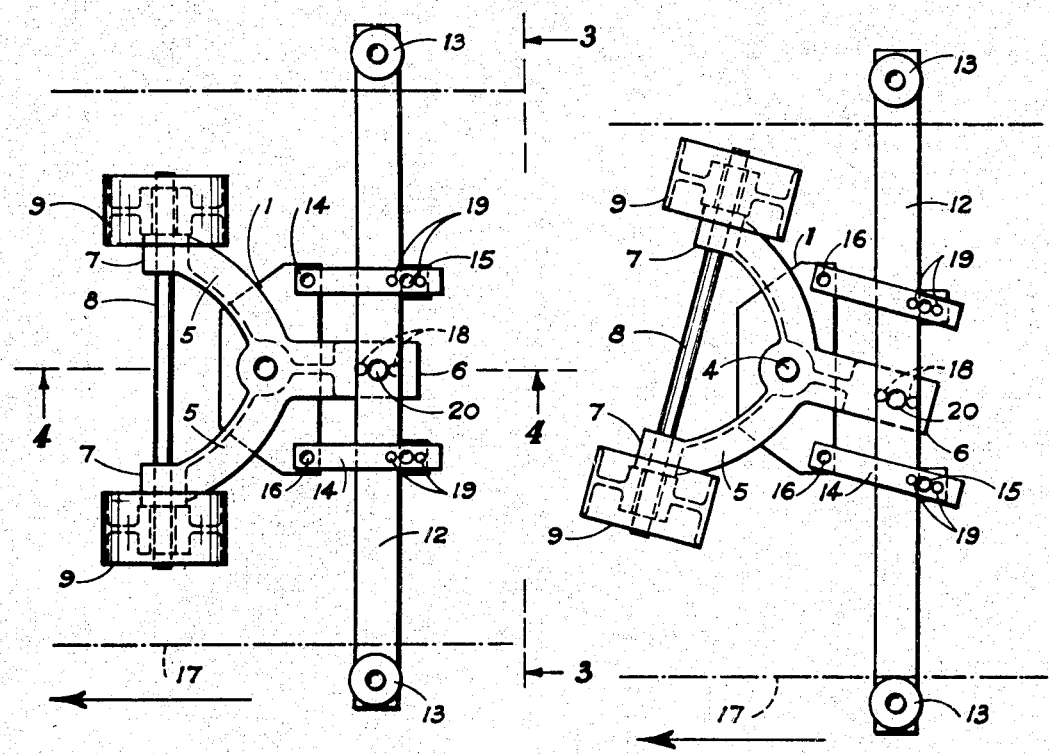
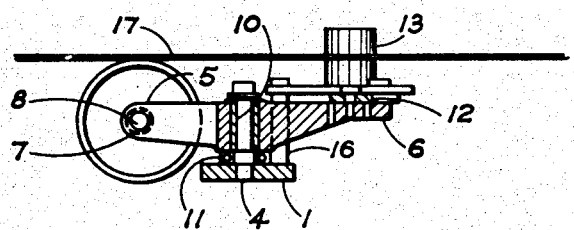
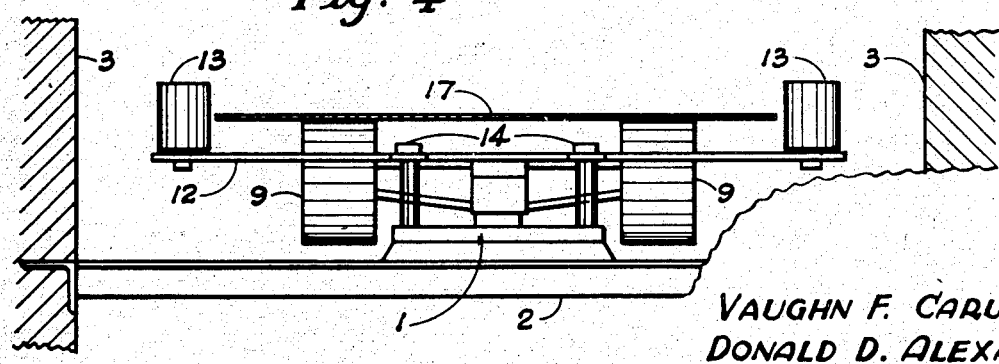

2,160,057

UNITED STATES PATENT OFFICE 2,160,057

CONVEYER ALIGNING DEVICE

Vaughn F. Carus and Donald D. Alexander, Saginaw, Mich., assignors, by mesne assignments, to Baker Perkins Company, Inc., Saginaw, Mich., a corporation of New York Application September 22, 1937, Serial No. 165,164

4 Claims. (Cl. 198—202)

This invention relates to a device for tracking, or keeping in longitudinal alignment, flexible conveyers; and as an illustrative embodiment of this invention it may be considered in connection with a steel band oven, that is an oven having a continuous flexible steel band or conveyer passing over pulleys or drums at or near the ends of the oven and upon the top surface of which the goods are baked.

In baking goods, particularly biscuits and crackers upon the steel conveyer of an oven, the goods are deposited in regularly spaced alignment, and it is desirable to maintain these goods upon the conveyor in the same relation as cut or died out of the dough in order to facilitate removal for packing; consequently, it is desirable to have the conveyer travel through the oven in central alignment so that the goods will lay on the conveyer in straight rows approximating the order in which they are cut by the cutting or forming machine.

In conveyers of this type, it has been found extremely difficult to maintain the bands centrally aligned over their pulleys or drums because of the tendency to wander to one side of the oven.

In constructing pulleys for this type of conveyer, it has been found that crowned pulleys are impractical because of the tendency to stretch or distort the conveyer out of shape at its central part, that is the conveyor will be permanently bowed or crowned. Consequently, the pulleys used on steel band conveyers have a very slight crown or no crown at all, hence the difficulty of maintaining the conveyer in central alignment.

The present invention comprises one or more rotatable wheels or rollers which bear against a surface of the conveyer and which are so supported on a pivoted frame that their axes are in off-set relation to the pivotal point of the frame causing the aligning wheels to move in an arc of substantial radius and be displaced laterally to greatly increase the friction between the wheels and the conveyer when it tends to move laterally of its true medial line of travel, thus making the aligning device more effective by reducing, to a minimum, the lateral movement of the conveyer.

The wheels or rollers of the tracking device are moved about their off-set pivotal axes by the conveyer itself as it engages a shifting device connected with the wheels or rollers by a parallel motion connection so that as the conveyor wanders, its movement will swing the wheels or rollers about its off-set pivotal axis and by its castering effect increase the frictional resistance between the rollers and conveyer and thus overcome the tendency of the conveyer to wander, and also cause the conveyer to return to its normal center line of travel and hold it there.

It is understood that hereafter when "wheels" are mentioned it is intended to include in its meaning rollers, discs, and other rotatable devices which will engage a surface of the conveyer an cause it to return to normal position and maintain it in its true central line of travel.

It is therefore a prime object of this invention to provide a conveyer aligning device which will prevent a conveyer from wandering and in the event abnormal conditions cause it to wander, will return it to its normal medial position and hold the conveyer at its normal medial position without constantly shifting from one side of the medial position to the other. The off-set pivotal relation between the axes of the wheels and the supporting plate causes the wheels, when reaching their medial central position, to stop at this point which is the point of least resistance, and once the wheels reach this position, there is no tendency for them to move beyond their medial central position as has been the difficulty with other types of aligning devices, and thus cause the band to continuously wander or weave from side to side across the normal medial position.

It is a further object of this invention to provide a conveyer tracking or aligning device which is positive in action and with a minimum of transverse movement of the conveyer whereby the goods on the conveyer may be carried in the desired straight alignment.

It is a still further object of this invention to provide a conveyer tracking or aligning device which is simple and inexpensive in construction and easily installed on any band or belt type conveyer having a tendency to drift or wander to one side of a true alignment.

It is a still further object of the invention to provide means for adjusting the length of the radius of the arc through which the wheel moves to increase or decrease the frictional contract of the wheels against the surface of the conveyor.

With these and other objects in view which will appear later in the specification, our invention comprises the devices described and claimed and the equivalents thereof.

As an illustrative embodiment of this invention, the drawing will now be considered which:

Fig. 1 is a top plan view of our invention showing the conveyer aligning device in a normal operating position.

Fig. 2 is a plan view similar to Fig. 1 showing, in exaggeration, the position of the aligning device when the conveyer has wandered to one side of a central alignment.

Fig. 3 is an elevation of the device as viewed from the rear or in the direction of the arrows.

Fig. 4 is a sectional elevation taken on the line 4—4 Fig. 1.

1 is a stationary supporting base which may be secured in any suitable manner to a conveyer bed or as shown by a support bar 2 fastened to the side frames 3—3 of the conveyer or oven. Secured to the supporting base 1 is an upright shaft or spindle 4 which pivotally supports the frame of the aligning device. The frame is preferably constructed in the form of a Y, as viewed in plan, and has two bifurcated arms 5—5 and a single straight arm 6. The bifurcated arms 5—5 have bearings 7—7 formed at their ends through which a shaft 8 passes. The ends of the shaft 8 rotatably supports the aligning wheels 9—9 which may be rotatable on the shaft or alternatively may be secured thereto and the shaft rotatably mounted in the bearings.

Extending vertically downward from the junction of the two bifurcated arms 5—5 and the straight arm 6 and rearwardly of the shaft bearings 7 is a hollow sleeve or journal 10 which is pivotally mounted on the spindle 4. In order to reduce the friction between these two members, the lower end of the sleeve or journal 10 is preferably supported by a frictionless bearing 11 carried by the supporting base 1.

Near the end of the straight arm 6 of the Y is pivoted a shift bar 12 carrying at each end a vertically pivoted roller 13 normally adjacent to an edge of the conveyer 17 and preferably spaced apart a distance slightly greater than the width of the conveyer band so that slight irregularities in the edges of the conveyer will not be constantly displacing the shift bar 12.

The aligning device is preferably located beneath the upper or tight run of the conveyer band near the driving drum or pulley with the aligning wheel in frictional contact with the under surface of the conveyer band so that when the wheels are at exactly right angles to the direction of travel, the minimum friction between the wheels and conveyer will cause it to be carried centrally over the drums.

Should the conveyer band wander too far to one side of its normal axial center line, one edge of the band will engage a roller 13 as shown in exaggeration, in Fig. 2 and move the shift bar 12 in the direction of its wandering, swinging the Y frame about the off-set spindle 4 so that the aligning wheels are moved angularly and in an arc and in a direction opposite to the wander of the band. The frictional resistance of the wheels against the under surface of the conveyer will be increased and this resistance will overcome the tendency of the conveyer to continue its lateral movement and by the castering action return the conveyer to its normal position bringing the shift bar 12 and associated parts to the position shown in Fig. 1. The aligning wheels now being at exactly right angles to the normal center line of travel, the band will travel centrally of the drums or pulleys, and will be maintained in this position due to an arc of substantial radius through which the wheels have to swing.

In order to maintain the shift bar 12 at right angles to the normal center line of travel of the conveyer, a parallel motion connection is provided consisting of a pair of links 14—14 pivoted at one end as at 15 to the shift bar and at their opposite end to a pair of studs 16 carried by the supporting base 1 or other part of the device to prevent the shift bar 12 from moving angularly and thus bind the conveyer between the two rollers 13—13 when the conveyer wanders too far to one side of its normal center line of travel. This arrangement permits a closer clearance between the edges of the conveyer 17 and the rollers 13—13.

In certain types of conveyers it may not be necessary to shift the angular position of the aligning wheels as far as shown in Fig. 2. Where less angular movement is required, adjustable features are provided to shorten the radius of the arc through which the wheels move when the conveyer wanders laterally. This adjustment consists of a series of slots or holes 18 in the straight arm 6 of the Y frame, and a series of holes 19—19 in the links 14—14.

By shifting the studs 15 and 20 into the holes 18 and 19, the radius of the arc can be reduced and the angular movement of the wheels decreased.

Further modifications may consist of a single roller extending either part way across the conveyer or the full width thereof instead of the wheels as shown. Similarly a plurality of these aligning devices could be used to support the conveyer throughout its length and the usual supporting rollers be omitted, especially if an extremely long conveyer band be used. Likewise the conveyer aligning device can be located on the return run as well as the working run of the conveyer and placed on either surface of the conveyer so long as they do not interfere with the goods carried by the conveyer.

By the above described means, we have produced a conveyer aligning device which is more sensitive to slight wanderings and maintains the conveyer in a straighter line of travel than has heretofore been possible, is simple and inexpensive in construction and easily installed and maintained even in baking ovens having a high temperature.

Having thus described our invention, what we claim and desire to secure by Letters Patent is:

1. A conveyer aligning device comprising a wheel for engaging a surface of a conveyer, a frame for supporting said wheel, a support for said frame, a pivotal connection between said frame and said support, said pivotal connection being off-set from the axis of said wheel, a shift bar pivotally connected to said wheel supporting frame and engageable by said conveyer when it moves laterally to swing said wheels in an arc to cause said conveyer to return to its normal medial position and retain it there, and a parallel link connection between said support and said shift bar.

2. A conveyer aligning device comprising a wheel for engaging a surface of a conveyer, a frame for supporting said wheel, a support for said frame, a pivotal connection between said frame and said support, said pivotal connection being off-set from the axis of said wheel, a shift bar pivotally connected to said wheel supporting frame and engageable by said conveyer when it moves laterally to swing said wheels in an arc to cause said conveyer to return to its normal medial position and retain it there, a parallel link connection between said support and said shift bar, and means on said parallel link connection and said wheel supporting frame for adjusting the radius of the arc through said wheels swing.

3. Conveyer aligning device comprising a wheel for engaging a surface of a conveyer and maintaining said conveyer in longitudinal alignment, a frame for supporting said wheel, a support for said frame, a pivoted connection between said frame and support, said pivotal connection being offset from the axis of said wheel, a shift bar engageable by said conveyer when it moves laterally, an adjustable pivotable connection between said shift bar and said wheel supporting frame, a parallel link pivotally connected to said support and said shift bar and adjustable pivots connecting said shift bar and said link whereby the radius of the arc through which the wheels swing may be adjusted.

4. A conveyer aligning device comprising a rotatable wheel for engaging the under surface of a conveyer, a supporting frame for said wheels pivoted about the normal medial center line of said conveyer and offset from the axis of said wheels, a shift bar pivoted to said supporting frame and embracing said conveyer, means at the ends of said shift bar engageable by said conveyor when it wanders laterally from said medial center line to displace said shift bar laterally and rotate said supporting frame and wheels to an angular position opposite the lateral movement of said conveyer to increase the frictional contact between said wheels and said conveyer and cause said conveyer to return to its normal medial center line of travel, and a parallel motion connection for said shift bar whereby said shift bar will move in a path at right angles to the medial center line of travel of said conveyer.

VAUGHN F. CARUS.
DONALD D. ALEXANDER.